US009426295B2

(12) United States Patent
Li (10) Patent No.: US 9,426,295 B2
(45) Date of Patent: Aug. 23, 2016

(54) METHOD AND DEVICE FOR DISTRIBUTING MOBILE ATTENDANT CALL (71) Applicant: ZTE CORPORATION, Shenzhen, Guangdong Providence (CN)

(72) Inventor: Weihua Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 84 days.

(21) Appl. No.: 14/419,701

(22) PCT Filed: Jun. 27, 2013

(86) PCT No.: PCT/CN2013/078174
§ 371 (c)(1),
(2) Date: Feb. 5, 2015

(87) PCT Pub. No.: WO2013/185655
PCT Pub. Date: Dec. 19, 2013

(65) Prior Publication Data
US 2015/0201079 A1 Jul. 16, 2015

(30) Foreign Application Priority Data
Jul. 2, 2012 (CN) .......................... 2012 1 0225091

(51) Int. Cl.
H04M 3/42 (2006.01)
H04M 3/523 (2006.01)
H04M 3/51 (2006.01)
H04W 4/16 (2009.01)

(52) U.S. Cl.
CPC .......... H04M 3/5233 (2013.01); H04M 3/5125 (2013.01); H04M 3/5175 (2013.01); H04M 3/523 (2013.01); H04W 4/16 (2013.01); H04M2203/402 (2013.01); H04M 2203/6018 (2013.01); H04M 2203/651 (2013.01)

(58) Field of Classification Search
CPC .............. H04M 3/523; H04M 3/5233; H04M 2203/402; H04M 2203/6018; H04M 2203/651; H04M 3/5125; H04M 3/5175; H04M 3/5158; H04M 3/5191
USPC ............................................... 455/414.1–417
See application file for complete search history.

(56) References Cited

U.S. PATENT DOCUMENTS

2005/0008140 A1 1/2005 Bala et al.
2012/0069987 A1* 3/2012 Fan ..................... H04M 3/5183
379/266.01

FOREIGN PATENT DOCUMENTS

CN 101631171 A 1/2010
CN 101895848 A 11/2010
(Continued)

Primary Examiner — Ronald Eisner
(74) Attorney, Agent, or Firm — Ling Wu; Stephen Yang; Ling and Yang Intellectual Property (57) ABSTRACT A method and device for distributing an incoming call to a mobile agent are disclosed. The method includes: receiving a message for requesting a customer service representative; after determining that there is no idle online agent who has a skill of serving the call, selecting one agent from offline agents lists to serve the incoming call to provide the manual service; and sending a notification message to a mobile terminal corresponding to the selected agent, wherein, the notification message is used for notifying the customer service representative to login a call center system through the mobile terminal to provide the manual service. With the above technical scheme, it can at least solve the technical problem that it is difficult to perform real-time processing on a manual service request for certain agents not always in a state of logining the call center system in the related art.

20 Claims, 4 Drawing Sheets (56) References Cited

FOREIGN PATENT DOCUMENTS

| CN | WO2010/142171 A1 * | 12/2010 | ............. | H04M 3/24 |

| CN | 102299967 A | 12/2011 |
| WO | 0070849 A2 | 11/2000 |
| WO | WO2006037836 A1 | 4/2006 |

* cited by examiner

METHOD AND DEVICE FOR DISTRIBUTING MOBILE ATTENDANT CALL

TECHNICAL FIELD

The present document relates to the field of mobile agents, and specifically, to a method and device for distributing an incoming call to a mobile agent.

BACKGROUND

An agent is an important device in a call center (or a customer service center), and it provides an interactive operation interface when a customer service representative serves a user.

With the increase of the bandwidth of 3G and 4G mobile networks and the enhancement of the ability of mobile intelligent terminals (a smartphone and a PAD, etc.), a mobile intelligent terminal comprehensively support services such as voices, videos and data and so on, which provides a network and terminal base for transplanting an agent system to the mobile intelligent terminal. With the development of social networks, a concept of social network is integrated in the call center, everyone can be a customer service representative to provide personalized services, and this proposes social objective needs for the development of the mobile agent.

In the related art, it includes two ways for implementing the mobile agent: 1) a mobile agent based on a client application program and 2) a mobile agent based on a WEB. Wherein, the first way is to install a client program on the mobile terminal; the second way is implemented based on the WEB, and it is to operate a mobile agent program through a browser of the mobile terminal.

No matter the mobile agent is implemented in whichever ways, as an unprofessional service personnel, it is impossible for him/her to log in a call center system constantly, thus an on demand service is wished to be provided. Therefore, a new call distribution way is required to satisfy such on demand service mode, which is required not only to satisfy that the user's problems are solved in time to promote a First Call Resolution (FCR) of the call center, but also to satisfy such working mode of instant processing on demand of the service personnel of the mobile agent.

With respect to the above problem, no effective solution has been proposed at present.

SUMMARY

The present document provides a method and device for distributing an incoming call to a mobile agent, to at least solve the technical problem that it is difficult for certain agents not always in the state of logining the call center system to perform real-time processing on a manual service request are in the related art.

With respect to the above problem, the present document provides the following technical scheme.

A distribution method of a call for a mobile agent, comprising:

receiving a message for requesting a customer service representative;

after determining that there is no idle online agent who has a skill to serve the call, selecting one agent from offline agents lists to serve the incoming call to provide the manual service; and sending a notification message to the mobile terminal corresponding to the selected agent, wherein, the notification message is used for notifying the customer service representative to login the call center system through the mobile terminal to provide the manual service.

Alternatively, the step of selecting one agent from offline agents to serve the incoming call to provide the manual service comprises:

selecting one agent from the offline agents lists to serve the incoming call to provide the manual service according to the agent's skills and the terminal's context information.

Alternatively, the step of sending a notification message to the mobile terminal corresponding to the selected agent comprises:

determining a service number of the mobile terminal according to an agent Identity (ID) corresponding to the agent, wherein, the agent ID and the service number are in a one-to-one corresponding relationship; and sending the notification message to the mobile terminal through the service number.

Alternatively, the agent ID and the service number are bound in a process of the call center system registering the agent.

Alternatively, the step of sending a notification message to a mobile terminal corresponding to a selected agent comprises:

determining a login mode of the agent; and sending a notification message corresponding to the login mode to the mobile terminal.

Alternatively, the login mode comprises: a WEB mode and/or a client application program mode.

Alternatively, when the login mode is the WEB mode, the notification message carries an agent Uniform Resource Locator (URL) and is used for notifying the customer service representative to start agent application to login the call center system through an address indicated by the agent URL.

Alternatively, when the login mode is the client application program mode, the notification message is used for notifying the customer service representative to login the call center system by starting an agent application program.

Alternatively, the step of sending a notification message to a mobile terminal corresponding to a selected agent comprises:

a Computer Telecommunication Integration (CTI) in the call center system sending the notification message to the mobile terminal corresponding to the agent.

A distribution device of a call for a mobile agent, comprising: a receiving unit, a selection unit and a sending unit, wherein:

the receiving unit is configured to: receive a message for requesting a customer service representative;

the selection unit is configured to: after determining that there is no idle online agent who has a skill to serve the call, select one agent from offline agents to serve the incoming call to provide the manual service; and the sending unit is configured to: send a notification message to a mobile terminal corresponding to a selected agent, wherein, the notification message is used for notifying the customer service representative to login a call center system through the mobile terminal to provide the manual service.

Alternatively, the selection unit is further configured to:

select one agent from the offline agents lists to serve the incoming call to provide the manual service according to the agent's skills and/or the terminal's context information.

Alternatively, the sending unit comprises a determination module and a sending module, wherein:

the determination module is configured to: determine a service number of the mobile terminal according to an agent ID corresponding to the agent, wherein, the agent ID and the service number are in a one-to-one corresponding relationship; and the sending module is configured to: send the notification message to the mobile terminal through the service number.

In the above technical scheme, after receiving a message for manual service, determine an offline agent to provide the manual service for the message in response to the message, and send a notification message to a mobile terminal corresponding to the offline agent to notify the customer service representative to login a call center system to provide the manual service. In the above way, it solves the technical problem that it is difficult for a non-real-time online mobile agent to perform real-time processing on an manual service request in the related art, which achieves a technical effect of improving timely processing on the manual service request and a flexibility of call distribution.

BRIEF DESCRIPTION OF DRAWINGS

Here, the described accompanying drawings are used to provide a further understanding of the present document and constitute a part of the present document. The schematic examples and illustrations thereof of the present document are used to explain the present document, but do not constitute an inappropriate limitation on the present document. In the drawings.

PREFERRED EMBODIMENTS OF THE DOCUMENT

The present document will be described in detail in combination with the accompanying drawings and examples below. It should be noted that the examples in the present document and the characteristics in the examples can be combined with each other in the condition of no conflict.

Figure 1:
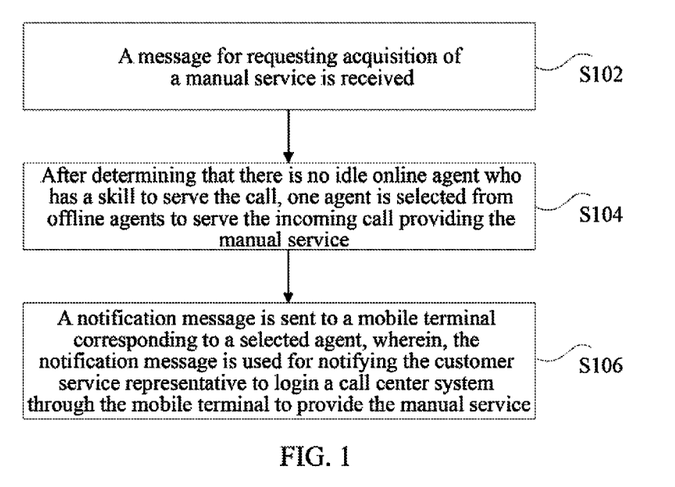
FIG. 1 is a preferred flow diagram of a method of distributing a call for a mobile agent according to the example of the present document.

The example provides a preferred method for distributing a mobile agent call, and as shown in FIG. 1, the following steps are included.

In step S102, a message for requesting acquisition of a manual service is received.

In step S104, one agent is selected from offline agents to serve the incoming call providing the manual service.

In step S106, a notification message is sent to a mobile terminal corresponding to the selected agent, wherein, the notification message is used for notifying the customer service representative to login a call center system through the mobile terminal to provide the manual service.

In the embodiment, after receiving a message for manual service, determine an offline agent who provides the manual service for the message in response to the message, and send a notification message to a mobile terminal corresponding to the offline agent to notify the customer service representative to login the call center system to provide the manual service. In the above way, the technical problem that it is difficult for a non-real-time online mobile agent to perform real-time processing on an manual service request in the related art is solved, which achieves a technical effect of improving timely processing on the manual service request and a flexibility of agent distribution, thereby enhancing the usability and universality of the mobile agent.

With a view to that an offline customer service representative is generally selected when there is no idle online customer service representative in practical applications, that is, an online customer service representative is preferably selected. That is, according to the above description, after determining that there is no idle online agent (also can be customer service representative), one agent can be selected from offline agents to serve the incoming call providing the manual service. That is, the agent in step S106 is the selected offline agent. Preferably, one agent can be selected from the offline agents to serve the incoming call providing the manual service according to agent skills and/or terminal context information.

Figure 2:
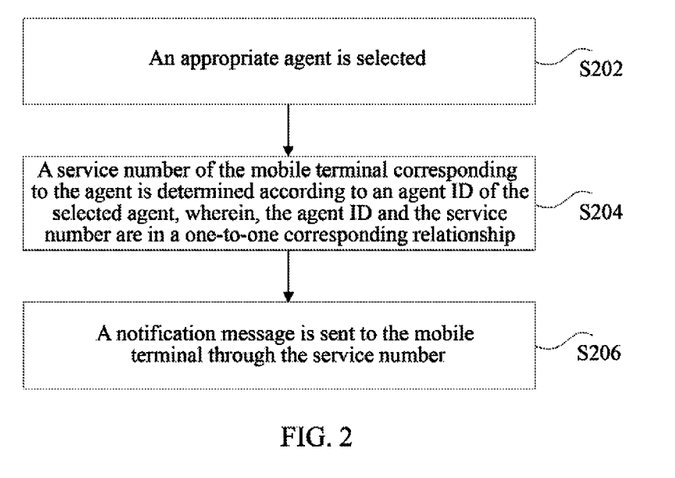
FIG. 2 is another preferred flow diagram of a method of distributing a call for a mobile agent according to the example of the present document.

In order to be able to identify the selected customer service representative and successfully send a notification message, an agent ID of the customer service representative and a service number (also can be a mobile phone number) of a mobile terminal corresponding to the customer service representative can be bound, so as to send the notification message to the customer service representative in time. In one preferred embodiment, as shown in FIG. 2, the step of sending a notification message to the mobile terminal corresponding to the customer service representative can include the following steps.

In step S202, an appropriate agent is selected.

In step S204, a service number of the mobile terminal corresponding to the agent is determined according to an agent ID of the selected agent, wherein, the agent ID and the service number are in a one-to-one corresponding relationship.

In step S206, a notification message is sent to the mobile terminal through the service number.

The binding of the above service number and agent ID can be performed when the customer service representative is registered, and in one preferred embodiment, the agent ID and the service number are bound in a process of the call center system registering the customer service representative.

The customer service representative can login the call center system through a WEB mode or a client mode, and it is required to adopt different policies with regard to different agent modes (also can be called login modes of the agent). Specifically, in one preferred embodiment, sending a notification message to the mobile terminal corresponding to the customer service representative includes: determining a login mode of the agent; and sending a notification message corresponding to the login mode to the mobile terminal. The above login mode includes: a WEB mode and/or a client application program mode.

Notification messages sent with respect to different agent modes are also different, which are described specifically as follows.

1) When the login mode is the WEB mode, the notification message carries an agent URL and is used for notifying the customer service representative to start agent application to login the call center system through an address indicated by the agent URL.

2) When the login mode is the client application program mode, the notification message is used for notifying the customer service representative to login the call center system by starting an agent application program.

Sometimes there may be that certain customer service representatives did not have time to provide services at that time or a failure occurs in the process of sending the notification message, which causes that it is unable to normally login the system to provide the service. Therefore, in order to avoid the problem that a user cannot acquire the manual service due to the above reason, in one preferred embodiment, after the step S106, the above method also includes the following steps.

In step S1, it is to judge whether the agent has logined the call center system through the mobile terminal within a preset time.

In step S2, if the agent does not login within the preset time, reselect one agent for the message for requesting a customer service representative.

With regard to all the above preferred embodiments, both selection of the agent and sending of the notification message can be implemented by a CTI in the call center system, for example, the CTI sends the notification message to the mobile terminal corresponding to the agent.

A device of distributing a mobile agent for a call is also provided in the example, the device is used for implementing the above examples and preferred embodiments, and what have been described will not be repeated. For example, a term "unit" or "module" used below can be a combination of software and/or hardware for implementing preset functions. Though the device described in the following examples is preferentially implemented by software, an implementation by hardware or a combination of software and hardware is also possible and conceived.

Figure 3:
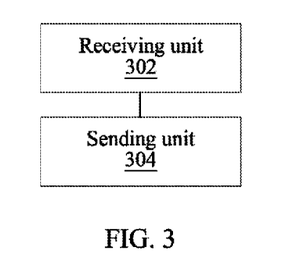
FIG. 3 is a preferred structure block diagram of a device of distributing a call for a mobile agent according to the example of the present document.

FIG. 3 is an alternative structure block diagram of a device for distributing a mobile agent call according to the example of the present document, as shown in FIG. 3, it includes a receiving unit 302 and a sending unit 304, and the structure will be described below.

The receiving unit 302 is configured to: receive a message for requesting acquisition of an manual service;

the sending unit 304, coupled with the receiving unit 302, is configured to: send a notification message to a mobile terminal corresponding to an agent, wherein, the notification message is used for notifying the customer service representative to login a call center system through the mobile terminal to provide the manual service.

Figure 4:
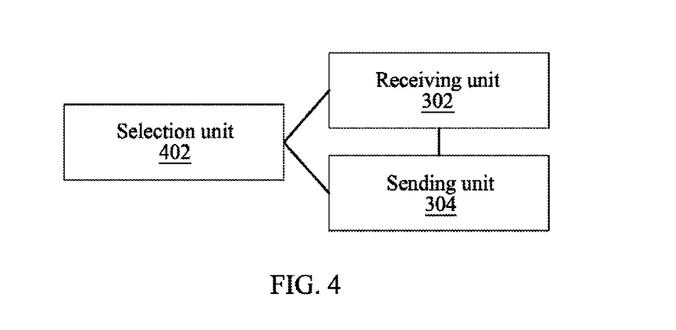
FIG. 4 is another preferred structure block diagram of a device of distributing a call for a mobile agent according to the example of the present document.

In one alternative embodiment, as shown in FIG. 4, the above device can also include: a selection unit 402, the selection unit 402 is coupled with the receiving unit 302 and the sending unit 304, and it is configured to: after receiving the message for requesting acquisition of the manual service, select one agent from online and offline agents to serve the incoming call to provide the manual service.

Alternatively, the selection unit 402 is further configured to: select one agent from the offline agents to serve the incoming call to provide the manual service according to agent skills and/or terminal context information.

Figure 5:
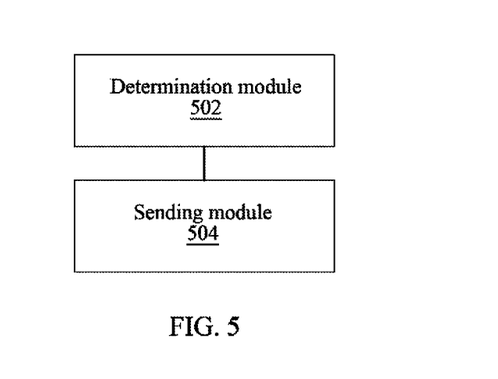
FIG. 5 is another preferred structure block diagram of a device of distributing a call for a mobile agent according to the example of the present document.

In one alternative embodiment, as shown in FIG. 5, the above sending unit 304 includes a determination module 502 and a sending module 504, wherein:

the determination module 502 is configured to: determine a service number of the mobile terminal according to an agent ID corresponding to the agent, wherein, the agent ID and the service number are in a one-to-one corresponding relationship; and the sending module 504, coupled with the determination module 502, is configured to: send the notification message to the mobile terminal through the service number.

The example also provides an alternative example to further illustrate the present document, but it should be noted that, the alternative example is only to better describe the present document, and do not constitute an inappropriate limitation on the present document.

Figure 6:
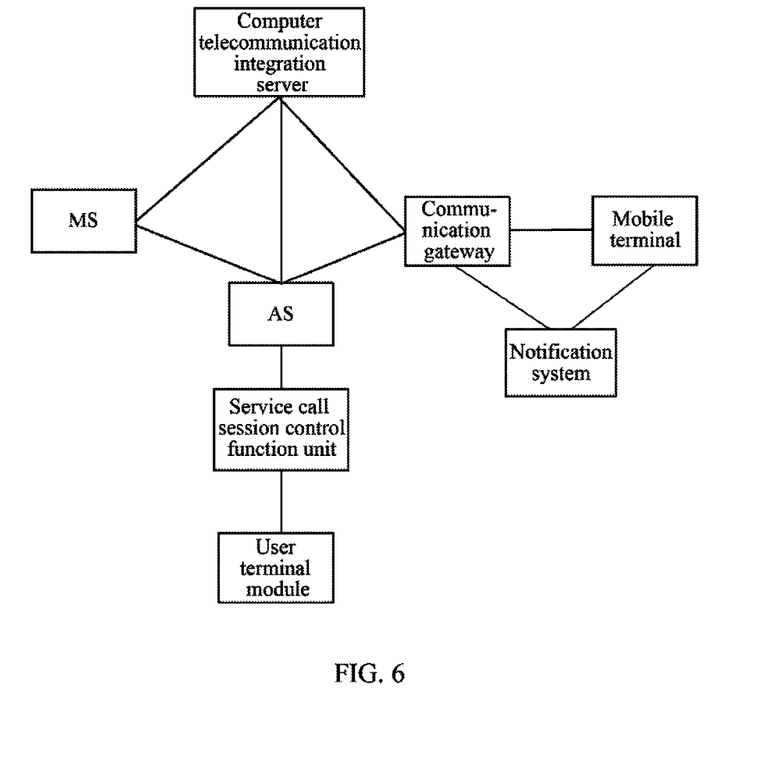
FIG. 6 is a systematic architecture diagram of a call center system including a mobile agent system according to the example of the present document.

As shown in FIG. 6, it is an architecture diagram of a call center system including a mobile agent system according to the example of the present document. As shown in FIG. 6, the call center system includes: a Call Session Control Function (CSCF) entity, an Application Server (AS), a Computer Telecommunication Integration (CTI) server, a communication gateway, a media server, a Web server and a mobile terminal. All the above composition entities will be described specifically below.

With regard to the S-CSCF, three types of CSCFs are defined, which are respectively: a Proxy CSCF (P-CSCF), an Inquiry CSCF (I-CSCF) and a Service CSCF (S-CSCF). When a user terminal initiates a service request, the P-CSCF is the first contact node, and it processes or forwards the received request or service. The I-CSCF can act as a connection point of all users of the network, and it can also serve as a service access point of a roaming user within the current network service area. The S-CSCF executes a session control function, and it can maintain session state information according to the network operators' needs. The S-CSCF is connected to the AS via an Interface Select Code (ISC) interface.

The AS, a core control point of the call center system, is configured to: receive a call of the S-CSCF, main functions of the AS include: call access, session management, call control, resource control and automatic flow control and so on, and generally an automatic Interactive Voice Response (IVR) function is also possessed.

The CTI server is responsible for agent management and queuing call routes. The CTI server receives a call for switching from automatic service to manual service by the AS, selects an idle agent, and distributes the call to the agent, if there is no idle agent, places the call in the queue to wait for agent distribution. In the call center system supporting the mobile agent, it mainly includes two kinds of idle agents: online agent and offline agent, wherein, the online agent is an agent who has logged in the call center system and is waiting for call distribution in real time; the offline agent is an agent who has been registered in the call center system but has not logged in the call center system at present. The CTI searches an agent according to a call type when distributing calls, preferably selects an online agent, and selects an offline agent when there is no online agent.

The communication gateway is responsible for message interaction between the call center system and the mobile agent as well as notification system. The communication gateway establishes a Transmission Control Protocol (TCP) connection with the mobile agent of the mobile terminal, the CTI server and the Application Server (AS) respectively, so as to complete message interaction between the mobile agent and the CTI server and Application Server (AS). The communication gateway is connected to achieve that the CTI server sends a notification message to the mobile terminal. The communication gateway also implements a protocol conversion of message interaction process and a conversion between a source address and a destination address.

The Media Server (MS) provides specific media resource services, such as functions including multiparty conference, recording, announcement and voice recognition and so on. The MS accepts control of the AS to complete operations such as allocation, processing and broadcast of media resources. The media server can utilize media resources of the core network or media resources self-allocated by the call center.

The mobile terminal runs mobile agents, including an agent based on a Web mode and an agent based on a client application program, and it is used for completing relevant operations for various calls and providing a user interface for the customer service representative. For example, it is to answer a call or initiate an outcall.

The notification system can be a short message system or an Always Online Infrastructure (AOI), and it is responsible for receiving a notification message of the CTI in real time and forwards the notification message to the mobile terminal. The notification system establishes a connection with the CTI and the mobile terminal respectively, which can provide different interface ways based on a short message center or the AOI and so on.

With regard to the AOI way, the mobile terminal will run an AOI client and receive a message sent from an AOI server in real time, and the AOI client determines whether to start an agent application program.

Based on the above call center system, the example also provides an alternative method for implementing the mobile agent, wherein firstly a mobile manual service personnel is registered, and the following steps are mainly included.

In step S1, the mobile manual service personnel logs in a call center portal to perform mobile agent registration. Wherein, the registered information mainly includes: a service number (e.g. it can be a mobile phone number and so on), skills (e.g. legal consulting and food consulting, etc.), a name, an identity card (including unique documents such as a passport and so on), an agent mode (Web agent, client application program, alternatively defaulted as the Web agent) and a login password, wherein, it can be set that the service number, skills, identity card, agent mode and login password are necessary.

In step S2, after the registration, the call center system allocates an agent ID and generates a secondary confirmation code, the call center system sends a secondary confirmation URL address and the secondary confirmation code to the mobile terminal through a notification message, the mobile terminal opens the secondary confirmation URL address and enters the secondary confirmation code, thus the call center system completes the binding of the agent ID and the service number.

In the above step S2, if the mobile agent is in the agent mode based on the client application program, the call center system allocates the agent ID after the registration, the call center system sends the agent ID to the mobile terminal through the notification message, after the mobile terminal receives the notification message, the customer service representative starts a mobile agent application program and enters passwords, the mobile agent application program sends the passwords entered by the customer service representative and the acquired service number of the mobile terminal to the CTI, the CTI performs matching according to the preset service number and passwords, if the service numbers and passwords are all matched, the call center system completes the binding of the agent ID and the service number.

Figure 7:
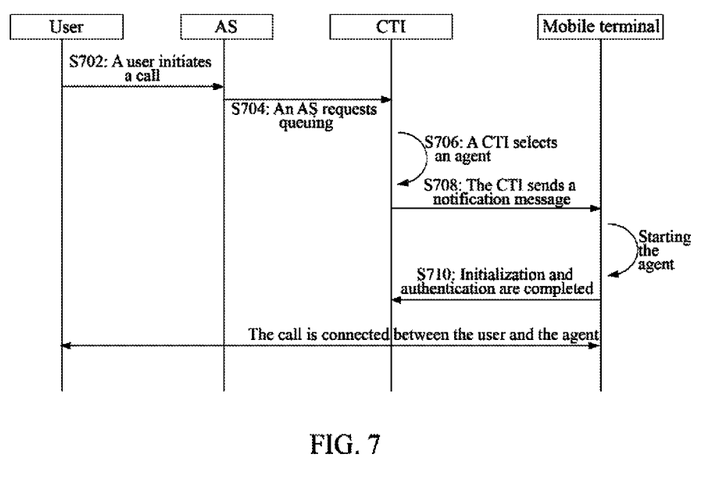
FIG. 7 is another preferred flow diagram of a method of distributing a call for a mobile agent according to the example of the present document.

FIG. 7 is a flow diagram of a method for implementing mobile agent call distribution according to the example of the present document. As shown in FIG. 7, the method for implementing the mobile agent call distribution mainly includes the following steps.

In step S702, a user initiates a call (e.g. voice, video or data) to request a manual service.

In step S704, an AS initiates a call queuing request to a CTI, wherein, the call request carries information including a call ID and a service type and so on.

In step S706, after receiving the queuing request message, the CTI performs matching according to the service type carried in the call and agent skills, selects an appropriate agent group, where a logged-in idle online agent is preferably selected, if there is no online agent, then a non-logged-in offline agent is selected, and an appropriate offline agent is selected according to context information of the agent. Wherein, the context information includes mobile terminal state information, such as states including idle, busy, power off, and not in service area and so on.

In step S708, after the CTI determines the selected mobile agent, the CTI sends a notification message to the selected mobile agent. Alternatively a waiting duration can be set. Alternatively, if the mobile agent does not complete login within the waiting duration set by the CTI, the CTI continues to select the next appropriate agent.

In the step S708, if the agent mode corresponding to the selected customer service representative is the WEB based mode, the CTI sends a mobile agent URL to the mobile terminal in a way of notification message, and sets a waiting duration.

If the agent mode corresponding to the selected customer service representative is based on the client application program, the CTI sends a notification message to the mobile terminal, and sets a waiting duration.

In step S710, after receiving the notification message, the mobile terminal logines a call center system to provide the manual service. Specifically, after the mobile agent program starts, it establishes a connection with a communication gateway, and completes initialization by interacting with the CTI and the AS through the communication gateway, the CTI queries an agent queue and a call queue to acquire an agent ID and a call ID according to the service number, and returns the agent ID and the call ID to the agent.

In the step S710, if it is the WEB based mode, the customer service representative opens the agent URL and starts a mobile agent program, the agent acquires the service number of the mobile terminal from the mobile terminal, completes login of the agent, answers the user's call, acquires a call ID, and acquires user information according to the call ID.

If it is the client application program based mode, the mobile terminal receives the notification message, the customer service representative starts a mobile agent application program, acquires the service number of the mobile terminal, completes login of the agent, answers the user's call, acquires a call ID, and acquires user information according to the call ID.

Alternatively, in order to prevent an incorrect login of the agent, entering password can be set when the customer service representative logs in. Whether the password is required to be entered or not can be configured during registration in the portal or later, configuration items about whether to enter password are contained when the CTI sends the URL. Or in the mode based on the client application program, the password is entered when the customer service representative starts the client application program to perform login, and whether the password is required to be entered or not can be configured locally.

It can be seen from the above description that, the following technical effects are implemented in the above alternative embodiments: the problem of mobile agent call distribution is solved, and it enables the mobile customer service representative to provide a working mode of serving on demand, and saves time of the customer service representative, which is easier to use and popularize, thereby facilitating the system to select a specialist agent or expand the customer service representative scope to serve users, and improving the user satisfaction degree of the system effectively.

In another example, software is also provided, and the software is used for executing the above examples and the technical scheme described in the alternative embodiments.

In another example, a storage medium is also provided, the above software is stored in the storage medium, and the storage medium includes but is not limited to: an optical disk, a floppy disk, a hard disk and an erasable memory, etc.

It can be seen from the above description that, the present document implements the following technical effects:

after receiving a message for manual service, an offline customer service representative who provides the manual service for the message is determined in response to the message, and a notification message is sent to a mobile terminal corresponding to the offline customer service representative to notify the customer service representative to login a call center system to provide the manual service. In the above way, the technical problem that it is difficult for a non-real-time online mobile agent to perform real-time processing on an manual service request in the related art is solved, which achieves a technical effect of improving timely processing on the manual service request and a flexibility of agent distribution.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, and in some cases, the illustrated or described steps can be executed in a sequence different from here, or they can be made into multiple integrated circuit modules respectively or multiple modules or steps of them can be made into a single integrated circuit module to be implemented. Therefore, the present document is not limited to any combination of hardware and software in a specific form.

The above description is only the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

In the above technical scheme, after receiving a message for manual services, an offline customer service representative who provides the manual service for the message is determined in response to the message, and a notification message is sent to a mobile terminal corresponding to the offline customer service representative to notify the customer service representative to login a call center system to provide the manual service. In the above way, the technical problem that it is difficult for a non-real-time online mobile agent to perform real-time processing on a manual service request in the related art is solved, which achieves a technical effect of improving timely processing on the manual service request and a flexibility of agent distribution.

What is claimed is:

1. A distribution method for a call to a mobile agent, the method comprising:
   receiving, at a server in a call center system, a request to service a call to the call center system;
   upon determining, by the server, that there is no agent in an online idle state who has a skill to service the call, selecting, by the server, one agent from a pool of agents who are in an offline state, to service the call; and
   sending, by the server, a notification message to a mobile terminal, the mobile terminal corresponding to the selected agent, wherein the notification message is used for notifying the selected agent to log into the call center system through the mobile terminal to service the call.

2. The distribution method according to claim 1, wherein, the step of selecting, by the server, one agent from a pool of agents who are in an offline state, to service the call comprises:
   selecting, by the server, one agent from a pool of the agents who are in the offline state, to service the call according to agent skills and terminal context information.

3. The distribution method according to claim 1, wherein, the step of sending, by the server, a notification message to a mobile terminal, the mobile terminal corresponding to the selected agent comprises:
   determining, by the server, a service number of the mobile terminal according to an agent Identity (ID) corresponding to the selected agent, wherein, the agent ID and the service number are in a one-to-one corresponding relationship; and
   sending, by the server, the notification message to the mobile terminal according to the service number.

4. The distribution method according to claim 3, wherein, the agent ID and the service number are bound in a process of the selected agent registering at the call center system.

5. The distribution method according to claim 1, wherein, the step of sending, by the server, a notification message to a mobile terminal comprises:
   determining, by the server, a login mode of the selected agent; and
   sending, by the server, a notification message corresponding to the login mode to the mobile terminal.

6. The distribution method according to claim 5, wherein, the login mode comprises: a WEB mode and/or a client application program mode.

7. The distribution method according to claim 6, wherein, when the login mode is the WEB mode, the notification message carries an agent Uniform Resource Locator (URL) and is used for notifying the selected agent to start to access the call center system through an address indicated by the agent URL.

8. The distribution method according to claim 6, wherein, when the login mode is the client application program mode, the notification message is used for notifying the selected agent to access the call center system by starting an agent application program.

9. The distribution method according to claim 1, wherein, the step of sending, by the server, a notification message to a mobile terminal comprises:
   sending, by a Computer Telecommunication Integration (CTI) in the call center system, the notification message to the mobile terminal.

10. A distribution device for a call to a mobile agent, the device comprising; a receiving unit, a selection unit and a sending unit, wherein:
- the receiving unit is configured to; receive a request to service a call to a call center system;
- the selection unit is configured to, upon determining that there is agent in an online idle state who has a skill to service the call, select one agent from a pool of agents who are in an offline state, to service the call; and
- the sending unit is configured to; send a notification message to a mobile terminal, the mobile terminal corresponding to the selected agent, wherein the notification message is used for notifying the selected agent to log into the call center system through the mobile terminal to service the call.

11. The distribution device according to claim 10, wherein, the selection unit is further configured to:
- select one agent from a pool of the agents who are in the offline state, to the call according to agent skills and/or terminal context information.

12. The distribution device according to claim 10, wherein, the sending unit comprises a determination module and a sending module, wherein:
- the determination module is configured to: determine a service number of the mobile terminal according to an agent ID corresponding to the selected agent, wherein, the agent ID and the service number are in a one-to-one corresponding relationship; and
- the sending module is configured to: send the notification message to the mobile terminal according to the service number.

13. The distribution method according to claim 2, wherein, the step of sending, by the server, a notification message to a mobile terminal, the mobile terminal corresponding to the selected agent comprises:
- determining, by the server, a service number of the mobile terminal according to an agent Identity (ID) corresponding to the selected agent, wherein, the agent ID and the service number are in a one-to-one corresponding relationship; and
- sending, by the server, the notification message to the mobile terminal according to the service number.

14. The distribution method according to claim 13, wherein, the agent ID and the service number are bound in a process of the selected agent registering at the call center system.

15. The distribution method according to claim 2, wherein, the step of sending, by the server, a notification message to a mobile terminal comprises:
- sending, by a Computer Telecommunication Integration (CTI) in the call center system, the notification message to the mobile terminal.

16. The distribution method according to claim 3, wherein, the step of sending, by the server, a notification message to a mobile terminal comprises:
- sending, by a Computer Telecommunication Integration (CTI) in the call center system, the notification message to the mobile terminal.

17. The distribution method according to claim 4, wherein, the step of sending, by the server, a notification message to a mobile terminal comprises:
- sending, by a Computer Telecommunication Integration (CTI) in the call center system, the notification message to the mobile terminal.

18. The distribution method according to claim 5, wherein, the step of sending, by the server, a notification message to a mobile terminal comprises:
- sending, by a Computer Telecommunication Integration (CTI) in the call center system, the notification message to the mobile terminal.

19. The distribution method according to claim 6, wherein, the step of sending, by the server, a notification message to a mobile terminal comprises:
- sending, by a Computer Telecommunication Integration (CTI) in the call center system, the notification message to the mobile terminal.

20. The distribution method according to claim 7, wherein, the step of sending, by the server, a notification message to a mobile terminal comprises:
- sending, by a Computer Telecommunication Integration (CTI) in the call center system, the notification message to the mobile terminal.

* * * * *